United States Patent [19]
McMahon et al.

[11] Patent Number: 6,113,953
[45] Date of Patent: *Sep. 5, 2000

[54] MANUFACTURE OF LOWER-FAT AND FAT-FREE PIZZA CHEESE

[75] Inventors: Donald J. McMahon, Smithfield; Craig J. Oberg, Liberty, both of Utah

[73] Assignee: Utah State University, North Logan, Utah

[*] Notice: This patent issued on a continued prosecution application filed under 37 CFR 1.53(d), and is subject to the twenty year patent term provisions of 35 U.S.C. 154(a)(2).

[21] Appl. No.: 08/697,091

[22] Filed: Aug. 19, 1996

[51] Int. Cl.[7] .............................. A23C 9/12; A23C 9/13; A23C 19/08; A23C 19/05
[52] U.S. Cl. .............................. 426/36; 426/39; 426/40; 426/491; 426/518; 426/582
[58] Field of Search .............................. 426/36, 39, 40, 426/491, 518, 582

[56] References Cited

U.S. PATENT DOCUMENTS

| | | | |
|---|---|---|---|
| 4,277,503 | 7/1981 | Bily | 426/40 |
| 4,343,817 | 8/1982 | Swanson et al. | 426/36 |
| 4,476,143 | 10/1984 | Czulak et al. | 426/40 |
| 4,684,533 | 8/1987 | Kratochvil | 426/525 |
| 4,719,118 | 1/1988 | Thomas | 426/580 |
| 4,766,003 | 8/1988 | Skovhauge | 426/582 |
| 5,037,659 | 8/1991 | Trecker et al. | 426/40 |
| 5,064,660 | 11/1991 | Silver | 426/36 |
| 5,080,913 | 1/1992 | Gamay | 426/39 |
| 5,098,728 | 3/1992 | Singer et al. | 426/579 |
| 5,200,216 | 4/1993 | Barz et al. | 426/36 |
| 5,225,220 | 7/1993 | Gamay | 426/39 |
| 5,234,700 | 8/1993 | Barz et al. | 426/42 |
| 5,244,687 | 9/1993 | Rybinski et al. | 426/582 |
| 5,277,926 | 1/1994 | Batz et al. | 426/582 |
| 5,395,630 | 3/1995 | Gamay | 426/39 |

OTHER PUBLICATIONS

W.M. Breen et al. *Manufacture of Pizza Cheese Without Starter*, 47 J. Dairy Science, 1173–1180 (1964).

*Primary Examiner*—Donna C. Wortman
*Assistant Examiner*—Mary K. Zeman
*Attorney, Agent, or Firm*—Clayton, Howarth & Cannon, P.C.

[57] ABSTRACT

A fat-free or lower-fat pizza cheese with excellent melt properties for baking on a pizza without the need for aging and a method of making thereof are disclosed. The process of manufacturing such fat-free or low-fat mozzarella cheese comprises mixing a food grade acid with liquid milk having a fat content less than 1.5% or a casein to fat weight ratio of greater than 1.5. The acidified milk is then coagulated and processed into pizza cheese. No aging is necessary to obtain excellent melting properties. In a preferred embodiment, after coagulation of the milk and cutting of the curd, a portion of the whey is drained and glucono-δ-lactone is added to gradually further decrease the pH. The remaining whey is then drained and the resulting curd is processed into mozzarella cheese. A method of making a fat-free or low-fat process pizza cheese is also disclosed.

58 Claims, No Drawings

MANUFACTURE OF LOWER-FAT AND FAT-FREE PIZZA CHEESE

BACKGROUND OF THE INVENTION

This invention relates to lower-fat and fat-free pizza cheese and a method of making thereof. More particularly, the invention relates to lower-fat and fat-free pizza cheese, such as mozzarella cheese, and a method of making thereof, wherein the problem of excessive browning and charring of the cheese during baking on a pizza is greatly reduced or eliminated. This method of cheese-making further eliminates the need for aging of the cheese.

With the widespread interest in controlling the amount of fat in the diet, the cheese industry has for many years attempted to develop a method of making fat-free and lower-fat cheeses that are acceptable for their organoleptic, cooking, and other performance properties. For example, it would be desirable to have a no-fat or lower-fat mozzarella cheese that would be acceptable for its melt properties, such as blistering, meltdown, stretch, and tenderness, upon being baked on a pizza. It would also be desirable to develop a method of making pizza cheese such that the aging process standardly used in making such cheese could be reduced or eliminated.

The conventional method of making mozzarella cheese is described in Barz et al., U.S. Pat. No. 5,200,216 as follows:
 (a) pasteurizing cow's milk having a fat content in the range of about 1.5 to 3.5 weight percent;
 (b) fermenting the milk with one or more lactic acid-producing bacteria to produce a cheese milk;
 (c) coagulating the cheese milk to obtain a coagulum comprised of curd and whey;
 (d) cutting the curd and draining the whey therefrom, thereby leaving a cheese curd;
 (e) heating, kneading, and stretching the cheese curd until it is a homogeneous, fibrous mass having a moisture content in the range of about 45 to 60 weight percent and a milkfat content of at least about 30 percent on a dried solids basis;
 (f) placing the mass in a bath of cold brine to achieve cooling and salt penetration; and
 (g) removing the cooled cheese from the brine.

After the brining step, the resultant unripened mozzarella cheese traditionally has been aged at about 35–45° C. for about 7–21 days for developing characteristic taste and texture, as well as acceptable baking characteristics. The aging process is also known as ripening, curing, or maturation. All of the major components of cheese, carbohydrates, protein, and fat, are subject to modification during aging. Through a complex harmony of metabolic processes, these components are catabolized to lactic acid, peptides, amino acids, and fatty acids. After aging, the mozzarella cheese is usually comminuted (or shredded) and frozen such that the ripening process is halted.

Bily, U.S. Pat. No. 4,277,503, discloses a method of increasing the yield of cheese from milk by adding lecithin to the milk prior to coagulation or precipitation of curd in the milk. It is further disclosed that acid, such as lactic acid, can be used to precipitate cheese curd.

Swanson et al., U.S. Pat. No. 4,343,817, teach a method of making a natural cheese analog by adding dry casein to liquid whey, adjusting the pH to about pH 6.9 with an alkali metal hydroxide or alkaline earth metal hydroxide (such as calcium hydroxide), optionally adding an emulsifier, acidifying the mixture with a mineral or organic acid (preferably with lactic acid from a natural cheese starter culture), coagulating the liquid mixture with rennet or another coagulating agent, and then processing the cheese curd by conventional methods. Casein is disclosed as being obtained by acidification of skim milk with a bacterial starter culture or mineral acid.

Czulak et al., U.S. Pat. No. 4,476,143, describe a method of making cheese with a reduced fat content by inoculating milk having a fat content of 0.3–1.5% with a culture of *Lactobacillus bulgaricus* and *Streptococcus thermophilus* and with a culture of *L. casei* in addition to a normal cheese starter culture. Rennet is added to coagulate the curd, then half the whey is removed, sodium chloride is added so that the sodium ions exchange with calcium ions to disrupt calcium bridges between casein molecules thereby limiting contraction of the curd, and thereafter continuing the cheese-making process according to conventional methods.

Kratochvil, U.S. Pat. No. 4,684,533, discloses an imitation cheese product containing kappa carrageenan, gelatin, edible fat, and water, the product having a pH of 4.7 to 6.0 by addition of a food grade acid, such as adipic, citric, lactic, acetic, or phosphoric acid.

Trecker et al., U.S. Pat. No. 5,037,659, describe a method of making cheese from skim milk comprising the steps of subjecting the skim milk to ultrafiltration, adding a starter culture and a coagulating enzyme to the milk, fermenting the mixture, and evaporating under turbulent conditions to produce a skim milk cheese.

Silver, U.S. Pat. No. 5,064,660, teaches a method of producing low fat cheese products comprising the steps of forming a mixture of an edible protein and a fat, and plasticizing this mixture to cause rupture of fat globules and reduction in size of the protein matrix to form a self-emulsifying plastic cheese food product. It is further disclosed that cheese curd formation by direct acidification with food grade acids is a known process.

Gamay, U.S. Pat. No. 5,080,913, and Gamay, U.S. Pat. No. 5,225,220, disclose a method of making low fat cheese from milk having a fat content in the range of about 0–0.3%. Carrageenan is dissolved in the milk, then bacterial cheese cultures are added and the mixture is incubated at 85°–95° F. Next, calcium chloride and rennet (or other conventional clotting enzyme) is added to coagulate the milk. The curd is cut, heated, and allowed to settle, and then the whey is drained and the curd is washed with cold water. Finally, the cheese curd is salted and then hooped and pressed, or hooped and salted by immersion in brine, and then the resulting cheese is packaged. Gamay, U.S. Pat. No. 5,395,630, describes a similar process for making low-fat cheese suitable for preparing process cheeses involving use of lactic acid bacteria for adjusting the pH of the curd to pH 4.7–5.5 prior to separating the whey.

Singer et al., U.S. Pat. No. 5,098,728, discloses a method of making a reduced fat processed cheese by replacing all or part of the normal fat or oil content with a microparticulated protein. This protein is produced by treating whey protein concentrate by ultrafiltration and evaporation until the protein content is about 50–55% by weight. This whey protein concentrate is added to water with agitation. Food acid (such as lactic, acetic, citric, or hydrochloric acid) is added until a pH of about 4.4 is reached. The mixture is deaerated, heated to 165–180° F., passed through a microcooker, and cooled.

Barz et al., U.S. Pat. No. 5,200,216, and Barz et al., U.S. Pat. No. 5,234,700, disclose a method of eliminating the need for aging of mozzarella cheese by controlling the process such that a combined moisture and wet milkfat content of at least about 70% is attained.

Rybinski et al., U.S. Pat. No. 5,244,687, disclose a process of making a no-fat (less than 0.5%) cheese analog using a combination of a coagulated skin milk product (such as baker's cheese) and rennet casein together with water, emulsifying salts, and other conventional ingredients used in cheese analog production. It is taught that baker's cheese is made from skim milk using lactic acid culture or direct acid addition. It is further disclosed that acidulants, such as lactic acid, acetic acid, citric acid, adipic acid, phosphoric acid, propionic acid, butyric acid, and $C_1$–$C_8$ carboxylic acids, can be added for flavoring purposes. Example 1 describes a method of making no-fat mozzarella cheese analog, and Example 2 describes a failed attempt at making no-fat mozzarella cheese analog wherein the baker's cheese was omitted.

Batz et al., U.S. Pat. No. 5,277,926, discloses a method of making a low fat cheese product by first providing a mixture of low fat skim milk curd, salt, and an emulsifying salt. The mixture is heated and agitated to yield a cheese blend. An edible acid, such as sorbic acid, is added to control the growth of microorganisms. A wet mix of water and a texture modifying agent is added, then the cheese mixture is heated and agitated again to yield the final product.

W. M. Breene et al., Manufacture of pizza cheese without starter, 47 J. Dairy Sci. 1173–80 (1964), discloses making of mozzarella cheese from whole or part-skim milk by direct acidification.

In view of the foregoing, it will be appreciated that the prior art fails to disclose or suggest a method of making lower-fat and fat-free pizza, e.g. mozzarella, cheese without the use of bacterial starter cultures wherein the milk used as a starting material has less than 1.5% fat or wherein the milk has a casein to fat weight ratio greater than 1.5. Such a method and the cheese produced thereby would be significant advancements in the art.

BRIEF SUMMARY OF THE INVENTION

It is an object of the present invention to provide a method of making lower-fat and fat-free pizza cheeses wherein no bacterial cultures are used for acid production.

It is also an object of the invention to provide a method of making lower-fat and fat-free pizza cheeses by direct acidification such that the cheese has acceptable melting properties and requires no aging.

It is another object of the invention to provide a method of making lower-fat and fat-free pizza cheeses having a sufficient moisture content to permit baking in a forced-convection air oven without excessive burning.

It is still another object of the invention to provide a method of making lower-fat and fat-free cheeses wherein calcium content can be manipulated and melting properties are made independent of cheese pH.

It is yet another object of the invention to provide fat-free and lower-fat pizza cheeses such that the cheeses exhibit acceptable melting characteristics and require no aging.

These and other objects are accomplished in a process of manufacturing a lower-fat pressed pizza cheese that needs no aging to obtain acceptable melting properties without burning when baked on a pizza comprising the steps of:

(a) providing a liquid milk having a fat content less than 1.5% or a casein to fat weight ratio greater than 1.5;

(b) mixing the liquid milk with an effective amount of a food grade acid to obtain a mixture such that the pH thereof is in the range of about 4.8 to 5.8;

(c) adding an effective amount of a coagulation agent to the mixture such that the mixture is coagulated to result in formation of curds and whey;

(d) cutting the curds into pieces and stirring the pieces in the whey to promote syneresis;

(e) draining the whey from the pieces;

(f) mixing salt with the pieces from which the whey has been drained to obtain a curd and salt mixture with a salt concentration of about 0.5% to 3.0% by weight; and (g) pressing the curd and salt mixture into blocks to obtain a lower-fat pressed pizza cheese.

In one illustrative embodiment of this method, the mixture further comprises at least one member selected from the group consisting of emulsifiers, microparticulated proteins, emulsifying salts, calcium chelating agents, and stabilizers. The emulsifiers are selected from the group consisting of lecithin, soy protein isolates, lipoproteins, and mono- and di-glycerides, and the stabilizers are selected from the group consisting of starches, modified starches, dextrins, maltodextrins, pectins, carrageenans, microcrystalline cellulose, carboxymethylcellulose, and gelatin. Preferably, the curd and salt mixture has a salt concentration of about 1.0% to 2.0% by weight. Lower-fat pressed pizza cheese can also be manufactured according to a method comprising two or more steps of acid addition, as will be described in more detail momentarily.

A process of manufacturing a lower-fat mozzarella cheese that needs no aging to obtain acceptable melting properties without burning when baked on a pizza comprises the steps of:

(a) providing a liquid milk having a fat content less than 1.5% or a casein to fat weight ratio greater than 1.5;

(b) mixing the liquid milk with an effective amount of a food grade acid to obtain a mixture such that the pH thereof is in the range of about 4.8 to 5.8;

(c) adding an effective amount of a coagulation agent to the mixture such that the mixture is coagulated to result in formation of curds and whey;

(d) cutting the curds into pieces and stirring the pieces in the whey to promote syneresis;

(e) draining the whey from the pieces;

(f) stretching the pieces from which the whey has been drained in hot water or hot salt brine; and (g) cooling the pieces that have been stretched in water brine, or air such that a lower-fat mozzarella cheese having a salt concentration of about 0.5% to 3.0% by weight is obtained.

In one illustrative embodiment of this method, dry salt is added to the pieces from which the whey has been drained.

Another process of manufacturing a lower-fat mozzarella cheese that needs no aging to obtain acceptable melting properties without burning when baked on a pizza comprises the steps of:

(a) providing a liquid milk having a fat content less than 1.5% or a casein to fat weight ratio greater than 1.5;

(b) mixing the liquid milk with an effective amount of a food grade acid to obtain a mixture such that the pH thereof is in the range of about 5.6 to 6.0;

(c) adding an effective amount of a coagulation agent to the mixture such that the mixture is coagulated to result in formation of curds and whey;

(d) cutting the curds into pieces and stirring the pieces in the whey to promote syneresis;

(e) draining a portion of the whey from the pieces;

(f) adding an additional amount of food grade acid to the pieces from which a portion of the whey has been removed to further lower the pH, stirring until the pH is about pH 5.1 to 5.6, and then draining the remaining whey;

(g) stretching the pieces from which all of the whey has been drained in hot water or hot salt brine; and (g) cooling the pieces that have been stretched to obtain a lower-fat mozzarella cheese having a salt concentration of about 0.5% to 3.0% by weight.

Preferably, the food grade acid added in step (f) is glucono-δ-lactone.

A method of manufacturing a lower-fat process pizza cheese comprises the steps of:

(a) providing a lower-fat pizza cheese starting material comprising the steps of:
  (i) providing a liquid milk having a fat content less than 1.5% or a casein to fat weight ratio greater than 1.5;
  (ii) mixing the liquid milk with an effective amount of a food grade acid to obtain a mixture such that the pH thereof is in the range of about 4.8 to 5.8,
  (iii) adding an effective amount of a coagulation agent to the mixture such that the mixture is coagulated to result in formation of curds and whey,
  (iv) cutting the curds into pieces and stirring the pieces in the whey to promote syneresis,
  (v) draining the whey from the pieces,
  (vi) mixing salt with the pieces from which the whey has been drained to obtain a curd and salt mixture with a salt concentration of about 0.5% to 3.0% by weight, and
  (vii) pressing the curd and salt mixture into blocks to obtain a lower-fat pizza cheese starting material;
(b) adding an effective amount of an emulsifying salt to the lower-fat pizza cheese starting material to obtain a process cheese mixture; and then
(c) cooking the process cheese mixture at a temperature sufficient to melt the lower-fat pizza cheese starting material, thereby forming said lower-fat process pizza cheese.

The lower-fat pizza cheese starting material can also be manufactured using a method of manufacturing comprising two or more steps of acid addition. Preferably, the process cheese mixture further comprises at least one member selected from the group consisting of salt, flavorings, and milk solids.

DETAILED DESCRIPTION

Before the present lower-fat and non-fat pizza cheeses and method of making thereof are disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

It must be noted that, as used in this specification and the appended claims, the singular forms "a," "an," and "the" include plural referents unless the context clearly dictates otherwise. Thus, for example, reference to a fat-free or low-fat pizza cheese comprising "an acid" includes a mixture of two or more of such acids, reference to "an emulsifier" includes reference to one or more of such emulsifiers, and reference to "a stabilizer" includes reference to two or more of such stabilizers.

In describing and claiming the present invention, the following terminology will be used in accordance with the definitions set out below.

As used herein, "pizza cheese" means a pressed cheese or pasta filata (stretched) cheese suitable for use on a pizza. A preferred pizza cheese is mozzarella cheese, which is generally recognized as being a pasta filata cheese.

As used herein, "lower-fat" means milk having a milkfat content less than 1.5% and further refers to cheese or process cheese made therefrom. "Lower-fat" includes fat-free cheeses or milk.

As used herein, "non-fat," "fat-free," "skim," and similar terms refer to cheeses or milk substantially lacking in milkfat. The FDA defines "non-fat" cheese as cheese having a fat content of less than 0.5 g per 50 g serving, or less than 1%. The FDA definition is compatible with usage of the term herein.

As used herein, "food grade acid" means an acid or latent acid, masked acid, or acid precursor that is acceptable for use in food, and includes adipic, citric, lactic, acetic, phosphoric, hydrochloric, propionic, butyric, and $C_1$–$C_8$ carboxylic acids, glucono-δ-lactone, and mixtures thereof. Glucono-δ-lactone or GDL is slowly hydrolyzed to gluconic acid by water, and thus is a latent acid, masked acid, or acid precursor. Thus, GDL has a delayed effect in lowering pH. For example, a freshly prepared 1% aqueous solution has a pH of 3.6, which changes to pH 2.5 within 2 hours. Merck Index 638 (10th ed., 1983). Thus, adding GDL during cheese manufacture has the effect of gradually decreasing the pH of the curd. Certain food grade acids and salts thereof, such as citric acid and phophoric acid, have the benefit of chelating calcium, thus providing the added benefit of controlling calcium content of the cheese.

As used herein, "effective amount" means an amount of a food grade acid sufficient to reduce the pH of lower-fat milk to a selected pH. An "effective amount" of a coagulation agent is an amount of coagulation agent sufficient to coagulate an acidified lower-fat milk such that curds are formed.

As used herein, "coagulation agent" means a preparation, such as rennet, chymosin, pepsin, microbial rennets, recombinant rennets, and the like and mixtures thereof, that when used in an effective amount is capable of coagulating milk such that curds are formed.

As used herein, "stabilizer" means polysaccharides, gums, and the like that are acceptable for use in food and that can be added to cheese to aid in improving the melting properties of the cheese by reducing the amounts of inter-protein bonds. Preferred stabilizers include starches, modified starches, dextrins, maltodextrins, pectins, carrageenans, microcrystalline cellulose, carboxymethylcellulose, and gelatin. Stabilizers also have the benefit of increasing the opacity of the lower-fat and fat-free cheeses, thus improving the appearance thereof. Stabilizers also can be added to control the moisture content of the cheese, which also plays a role in the properties of the cheese upon baking on a pizza.

As used herein, "microparticulated protein" means a proteinaceous, water-dispersible macrocolloid comprising substantially non-aggregated particles of denatured protein. For example, U.S. Pat. No. 5,098,728 describes a microparticulated protein from acidified whey having in a dry state a mean particle diameter of about 0.1 to 2.0 μm.

Pizza cheese, and especially mozzarella cheese, is one of the primary components of a pizza. The performance characteristics, including the melting properties, of the pizza cheese are affected by a variety of factors, such as the style of the pizza (e.g. thin crust or thick crust), the type of oven used for baking the pizza, and the time and temperature conditions under which the pizza is baked. Melt characteristics are important in the pizza industry because these properties are readily evident to the consumer with respect to the acceptability of blistering, meltdown, and stretch, as well as tenderness, that result upon baking.

The protein, milkfat, and moisture present in pizza cheese all influence the melting characteristics thereof. Protein, specifically protein structure, is regarded as the primary factor affecting melting characteristics of cheese. More energy is required to denature, and hence melt, protein upon cooking than is required to melt the other cheese components. It has generally been believed that the amount of energy available under baking conditions in the pizza industry is insufficient to denature or melt protein components of pizza cheese unless the cheese has been aged. Aging partially breaks down the proteins in the cheese through the process of proteolysis. The resulting proteolyzed proteins are less complex and thus can be melted at lower temperatures than the native proteins in unaged cheese. Melting characteristics of cheese are further described in U.S. Pat. No. 5,200,216.

It has been discovered, unexpectedly and surprisingly, that aging of a lower-fat or fat-free pizza cheese according to the present invention is unnecessary to achieve the desired performance characteristics for use on a pizza, wherein use of bacterial cultures for acid production is replaced by direct acidification. Aging of a lower-fat or fat-free pizza cheese produced by this process is not only unnecessary, but is disadvantageous in view of the additional time, expense, and storage space that are needed for the aging process.

Melting of pizza cheese is also known to be affected by other factors, such as calcium retention. Calcium ions form salt bridges between casein micelles. Thus, cheese with a relatively high calcium content has a higher melting point and takes longer to melt than does cheese with a lower calcium content. Thus, the meltability of cheese produced according to the present invention can be controlled by reducing or removing calcium during the manufacturing process. Calcium chelating agents, such as citric acid, phosphoric acid, and salts thereof, such as sodium citrate, potassium citrate, disodium phosphate, and sodium aluminum phosphate, and other calcium chelating agents can be added such that the majority of chelating agents and chelated calcium is removed from the cheese with the removal of the whey. U.S. Pat. No. 5,395,630 also discloses a method of controlling the calcium content of process cheese by controlling the pH of the curd and whey mixture. At a pH of less than about pH 5.5, the calcium in the casein is more easily dissolved and then drained off during the step of removing the whey. U.S. Pat. No. 4,476,143 discloses exchanging monovalent cations for calcium ions to reduce the number of salt bridges between casein molecules. Regardless of whether the calcium removal is by addition of chelating agents, ion exchange, or by pH control, the resulting fat-free or lower-fat cheese exhibits improved melting characteristics.

Emulsifiers can also be used according to the present invention to improve the melting properties of pizza cheese prepared. These emulsifiers are protein-binding substances, such as lecithin, soy protein isolates, and the like, that have both hydrophobic and hydrophilic domains. These emulsifiers associate with the surfaces of polypeptide chains of proteins, rendering the proteins more hydrophilic and less able to form interprotein bonds. Thus, emulsifiers aid in reducing the amount of heat necessary for denaturing proteins and thus for melting of fat-free and lower-fat cheeses.

Stabilizers and microparticulated proteins can also be added to further aid in improving the melting properties of the cheese by reducing the amounts of interprotein bonds. Such microparticulated protein and stabilizers also have the benefit of increasing the opacity of the lower-fat and fat-free cheeses, thus improving the appearance and consumer acceptance thereof.

Processes whereby fat-free or lower-fat pizza cheeses can be directly acidified by addition of a food-grade acid or mixture of acids will now be described.

In a first method, lower-fat or fat-free milk is cooled to a temperature of about 8° C. or lower or left at about 30° C. and acidified. A sufficient amount of food-grade acid is added to the chilled milk such that a selected pH is obtained, preferably in the range of about pH 4.8 to 5.8 and more preferably in the range of about pH 5.2 to 5.6. Acidification can optionally take place at the warmer temperature provided that the acid is diluted and added slowly. Acidification at the lower temperature is preferred because no local coagulation occurs. The acidified milk is then warmed to a temperature of about 30–40° C., and then rennet or other coagulating agent is added to coagulate the milk. After coagulation has occurred, the curd is cut and the curd is stirred in the whey to allow expulsion of the whey from the curd (syneresis). The curd is typically cut by dicing into pieces having a length, width, or height no more than about 1.3 cm. However, a person skilled in the art can select other sizes and shapes of curd according to the equipment used for cutting the curd or to obtain certain selected results. For example, some equipment used in cheese-making cuts the curd into irregularly shaped pieces of varying sizes. Cutting the curd into larger pieces has also been discovered to increase the final moisture content of the resulting cheese. After cutting the curd, the whey is then drained, and then the curd is further processed by such steps as salting, pressing into blocks, cooking and stretching in hot water, and brining, which will be described in more detail momentarily.

While a similar method of replacing use of starter cultures with direct acidification has been used for full fat cheeses, it has not been used or suggested for use in the making of lower-fat or fat-free cheeses. In particular, there is no suggestion in the prior art that direct acidification permits the making of pizza cheese, such as mozzarella cheese, with excellent melting properties without the need for aging.

In another embodiment, the lower-fat milk is cooled to a temperature of about 8° C. or lower. A sufficient amount of food-grade acid is then added to the chilled milk such that a selected pH is obtained, preferably in the range of about pH 5.6 to 6.0. The acidified milk is then warmed to a temperature of about 30–40° C., and then rennet or other coagulating agent is added to coagulate the milk. After coagulation has occurred, the curd is cut and the curd is stirred in the whey to allow syneresis. After cutting the curd, the whey is then partially drained, and then an additional amount of food grade acid, preferably GDL, is added to the whey such that the pH is reduced to about pH 5.2 to 5.4, although this pH level is not critical. The curds, whey, and GDL are then stirred until a final pH of about pH 5.1 to 5.6 is obtained. Then the remaining whey is drained and the curd is further processed. Optionally, one or more additional steps of draining part of the whey and adding additional food grade acid to the remaining curds and whey can be inserted in the process prior to draining all of the remaining whey.

This latter method uses a two-step acidification procedure in which GDL is added to they whey/curd mixture, which is believed to be novel in the cheese-making art. This two-step procedure is advantageous in that the curd can be coagulated and cut at a higher pH than otherwise possible. This is important because casein micelles tend to dissociate at pH 5.2–5.5, which gives the resulting curd different properties than if the micelles remain intact. For example, W. M. Breene et al., 47 J. Dairy Sci. 1173, 1178 (1964), observed that mozzarella cheese made from whole or part-skim milk by direct acidification had excellent stretching properties at pH 5.6, whereas toughness and excessive fat losses were observed at pH 5.4. This stands in contrast to pizza cheese made with starter, which exhibits its characteristic stretchiness at pH 5.2–5.4, but fails to stretch at above pH 5.4 and becomes tough and loses excessive fat at below pH 5.2. F. V. Kosikowski, Problems in the Italian Soft Cheese Industry, 41 J. Diary Sci. 455 (1958).

After all the whey has been drained, the curds are then further processed. In one illustrative embodiment, dry salt is then added to the curds in an amount effective to achieve selected physical and/or sensory properties according to what is well known in the art. Preferably, such an amount of salt is in the range of about 0 to 2.5% by weight, and more preferably about 0.5 to 1.5% by weight. The resulting cheese is then pressed into blocks to result in a pressed pizza cheese that requires no aging to obtain excellent melting properties when used on a pizza. This pressed pizza cheese can then be packaged, or shredded and frozen, or shredded and used on a pizza, or used for making a process cheese.

In another illustrative embodiment, dry salt is added to the curds in an amount effective to achieve selected physical and/or sensory properties according to what is well known in the art. Preferably, such an amount of salt is in the range of about 0 to 2.5% by weight, and more preferably about 0.5 to 1.5% by weight. The resulting cheese is then stretched in hot water or in hot brine according to procedures well known in the art. The temperature of the water or brine, the length of time that the cheese is stretched, and the salt concentration of brine, if used, are all well known in the art. Following the stretching step, the stretched cheese is then cooled in water, brine, air, or by other means. This cooling step permits the molten cheese to harden into solid cheese. The temperature of such water or brine, the length of time of this cooling step, and the salt concentration of the brine, if used, are also according to what is well known in the art. The resulting finished cheese should have a salt concentration in the range of about 0.5 to 3.0% by weight, and preferably in the range of about 1 to 2% by weight. The resulting cheese is a lower-fat pasta filata pizza cheese, i.e. mozzarella cheese. This cheese needs no aging to obtain excellent melting properties upon baking on a pizza. Therefore, the cheese can be packaged, or shredded and frozen, or shredded and used on a pizza, or used for making a process cheese.

In still another illustrative embodiment, no dry salt is added to the curds, but the curds are stretched in hot water or in hot brine according to procedures well known in the art. The temperature of the water or brine, the length of time that the cheese is stretched, and the salt concentration of brine, if used, are all well known in the art. Following the stretching step, the stretched cheese is then cooled in water, brine, air, or by other means, with the proviso that salt must be added to the cheese in at least one step in the process such that the finished cheese has a salt concentration in the range of about 0.5 to 3.0% by weight, and preferably in the range of about 1 to 2% by weight. This cooling step permits the molten cheese to harden into solid cheese. The temperature of such water or brine, the length of time of this cooling step, and the salt concentration of the brine, if used, are also according to what is well known in the art. The resulting cheese is a lower-fat pasta filata pizza cheese, i.e. mozzarella cheese. This cheese needs no aging to obtain excellent melting properties upon baking on a pizza. Therefore, the cheese can be packaged, or shredded and frozen, or shredded and used on a pizza, or used for making a process cheese.

In another illustrative embodiment, pizza cheese prepared according to the present invention is further processed into process cheese. Usually, pressed cheese will be used in the manufacture of process cheese for economic reasons, i.e. it is less expensive to make pressed cheese than it is to make pasta filata cheese, however pasta filata cheese can also be used in making process cheese. As used herein, "process cheese" includes process cheese, process cheese food, and process cheese spread. Process cheese is made by combining cheese, emulsifying salt, salt, and optionally other ingredients such as flavorings, milk solids, and the like. These ingredients are heated such that the cheese is melted. The melted cheese and other ingredients are mixed, the molten mixture is pored into molds, and the temperature is then reduced such that the resulting process cheese solidifies. Process cheese food is similar, but can also contain additional milk solids, milk powders, and the like. Process cheese spread is similar to process cheese food except that the process cheese spread had a broader moisture range.

EXAMPLE 1

In this example, 200 pounds of skim milk and 3 pounds of skim milk powder were mixed and cooled to a temperature of about 8° C. or lower. To the cooled mixture, 80 g of citric acid and 500 ml of glacial acetic acid diluted ⅒ with water were added to reduce the pH to pH 5.65. The acidified milk mixture was then warmed to about 37.8° C. (100° F.) and 25 ml of single strength rennet was then added. After 15 minutes, the curd was cut, allowed to heal for 5 minutes, and then stirred for 5 minutes. At this stage of the process, half the whey was drained, and then 250 g of glucono-δ-lactone was added. After 30 minutes, the whey was drained to the top of the curd, and then an additional 100 g of glucono-δ-lactone was added. After an additional 30 minutes, the remaining whey was drained, and 100 g of salt was added to the curd over a 10 minute period. Following this salting step, the curd was stretched in a 10% salt brine solution at about 71.1° C. (160° F.). The stretched curd was then placed in cheese molds and immersed in cold water for 1 hour or until cool. The resulting fat-free mozzarella cheese was then dried, shredded, and vacuum packaged according to methods known in the art.

EXAMPLE 2

In this example, 200 pounds of skim milk and 3 pounds of skim milk powder were mixed and cooled to a temperature of about 8° C. or lower. To the cooled mixture, 80 g of citric acid and 500 ml of glacial acetic acid diluted ⅒ with water were added to reduce the pH to pH 5.65. The acidified milk mixture was then warmed to about 37.8° C. (100° F.) and 25 ml of single strength rennet was then added. After 15 minutes, the curd was cut, allowed to heal for 5 minutes, and then stirred for 5 minutes. At this stage of the process, half the whey was drained, and then 250 g of glucono-δ-lactone was added. After 30 minutes, the whey was drained to the top of the curd, and then an additional 100 g of glucono-δ-lactone was added. After an additional 30 minutes, the whey was drained, and 175 g of salt was added to the curd over a 15 minute period. Following this salting step, the resulting fat-free mozzarella cheese was filled into hoops, pressed for 2–4 hours, vacuum packaged, and cooled overnight according to procedures well known in the art.

EXAMPLE 3

In this example, 200 pounds of skim milk and 3 pounds of skim milk powder were mixed and cooled to a temperature of about 8° C. or lower. To the cooled mixture, an amount of citric acid sufficient to reduce the pH to about pH 5.6 was added. The acidified milk mixture was then warmed to about 37.8° C. (100° F.) and 25 ml of single strength rennet was then added. After 15 minutes, the curd was cut, allowed to heal for 5 minutes, and then stirred for 5 minutes. At this stage of the process, half the whey was drained and stirring of the curd was continued. After an additional 30 minutes, the remaining whey was drained, and 100 g of salt was added to the curd over a period of about 10 minutes. The salted curd was then stretched in a 10% salt brine solution at about 71.1° C. (160° F.). Following this step, the stretched and salted cheese was placed in cheese molds and immersed in cold water for 1 hour or until cool. The resulting fat-free mozzarella cheese was then dried, shredded, and vacuum packaged according to methods well known in the art.

EXAMPLE 4

In this example, 40 g of sodium citrate was added to 2 kg of fat-free cheese prepared according to the procedure of Example 1. This mixture was heated with stirring to about 76.7° C. (170° F.) in a cheese cooker according to methods well known in the art of making process cheese. The resulting molten cheese was poured into suitable containers, cooled, and packaged. The result was a fat-free process mozzarella cheese.

EXAMPLE 5

In this example, the procedure of Example 4 was followed with the exception that the fat-free cheese was prepared according to the procedure of Example 2. The result was a fat-free process mozzarella cheese.

EXAMPLE 6

In this example, the procedure of Example 4 was followed with the exception that the fat-free cheese was prepared according to the procedure of Example 3. The result was a fat-free process mozzarella cheese.

EXAMPLE 7

In this example, the procedure of Example 1 is followed with the exception that lower-fat milk is substituted for skim milk. The resulting cheese is a lower-fat mozzarella cheese.

EXAMPLE 8

In this example, the procedure of Example 2 is followed with the exception that lower-fat milk is substituted for skim milk. The resulting cheese is a lower-fat mozzarella cheese.

EXAMPLE 9

In this example, the procedure of Example 3 is followed with the exception that lower-fat milk is substituted for skim milk. The resulting cheese is a lower-fat mozzarella cheese.

EXAMPLE 10

In this example, the procedure of Example 4 is followed except that the lower-fat cheese of Example 7 is substituted for the fat-free cheese. The resulting cheese is a lower-fat process mozzarella cheese.

EXAMPLE 11

In this example, the procedure of Example 4 is followed except that the lower-fat cheese of Example 8 is substituted for the fat-free cheese. The resulting cheese is a lower-fat process mozzarella cheese.

EXAMPLE 12

In this example, the procedure of Example 4 is followed except that the lower-fat cheese of Example 9 is substituted for the fat-free cheese. The resulting cheese is a lower-fat process mozzarella cheese.

We claim:

1. A process of manufacturing a lower-fat pressed pizza cheese that needs no aging to obtain acceptable melting properties without burning when baked on a pizza comprising the steps of:

(a) providing a liquid milk having a fat content less than 1.5% or a casein to fat weight ratio greater than 1.5;

(b) mixing said liquid milk with an effective amount of a food grade acid to obtain a mixture such that the pH thereof is in the range of about 4.8 to 5.8;

(c) adding an effective amount of a coagulation agent to said mixture such that said mixture is coagulated to result in formation of curds and whey;

(d) cutting said curds into pieces and stirring said pieces in said whey to promote syneresis;

(e) draining said whey from said pieces;

(f) mixing salt with said pieces from which the whey has been drained to obtain a curd and salt mixture with a salt concentration of about 0.5% to 3.0% by weight; and (g) pressing said curd and salt mixture into blocks to obtain a lower-fat pressed pizza cheese.

2. The method of claim 1 wherein said food grade acid is a member of the group consisting of adipic, citric, lactic, acetic, phosphoric, hydrochloric, propionic, butyric, $C_1$–$C_8$ carboxylic acids, glucono-δ-lactone, and mixtures thereof.

3. The method of claim 2 wherein said food grade acid is glucono-δ-lactone.

4. The method of claim 1 wherein said coagulation agent is a member of the group consisting of rennet, chymosin, pepsin, microbial rennets, recombinant rennets, and mixtures thereof.

5. The method of claim 4 wherein said mixture further comprises at least one member selected from the group consisting of emulsifiers, microparticulated proteins, emulsifying salts, calcium chelating agents, and stabilizers.

6. The method of claim 5 wherein said emulsifiers are selected from the group consisting of lecithin, soy protein isolates, lipoproteins, and mono- and di-glycerides.

7. The method of claim 5 wherein said stabilizers are selected from the group consisting of starches, modified starches, dextrins, maltodextrins, pectins, carrageenans, microcrystalline cellulose, carboxymethylcellulose, and gelatin.

8. The method of claim 1 wherein said liquid milk is fat-free.

9. The method of claim 1 wherein the pH of said mixture is in the range of pH 5.2 to 5.6.

10. The method of claim 1 wherein said curd and salt mixture has a salt concentration of about 1.0% to 2.0% by weight.

11. A process of manufacturing a lower-fat pressed pizza cheese that needs no aging to obtain acceptable melting properties without burning when baked on a pizza comprising the steps of:

(a) providing a liquid milk having a fat content less than 1.5% or a casein to fat weight ratio greater than 1.5;

(b) mixing said liquid milk with an effective amount of a food grade acid to obtain a mixture such that the pH thereof is in the range of about 5.6 to 6.0;

(c) adding an effective amount of a coagulation agent to said mixture such that said mixture is coagulated to result in formation of curds and whey;

(d) cutting said curds into pieces and stirring said pieces in said whey to promote syneresis;

(e) draining a portion of said whey from said pieces;

(f) adding an additional amount of food grade acid to said pieces from which a portion of the whey has been drained to further lower the pH, stirring until the pH is about pH 5.1 to 5.6, and then draining the remaining whey;

(g) mixing salt with said pieces from which the whey has been drained to obtain a curd and salt mixture with a salt concentration of about 0.5% to 3.0% by weight; and (h) pressing said curd and salt mixture into blocks to obtain a lower-fat pressed pizza cheese.

12. The method of claim 11 wherein said food grade acid is a member of the group consisting of adipic, citric, lactic, acetic, phosphoric, hydrochloric, propionic, butyric, $C_1$–$C_8$ carboxylic acids, glucono-δ-lactone, and mixtures thereof.

13. The method of claim 11 wherein said coagulation agent is a member of the group consisting of rennet, chymosin, pepsin, microbial rennets, recombinant rennets, and mixtures thereof.

14. The method of claim 13 wherein said mixture further comprises at least one member selected from the group consisting of emulsifiers, microparticulated proteins, emulsifying salts, calcium chelating agents, and stabilizers.

15. The method of claim 14 wherein said emulsifiers are selected from the group consisting of lecithin, soy protein isolates, lipoproteins, and mono- and di-glycerides.

16. The method of claim 14 wherein said stabilizers are selected from the group consisting of starches, modified starches, dextrins, maltodextrins, pectins, carrageenans, microcrystalline cellulose, carboxymethylcellulose, and gelatin.

17. The method of claim 11 wherein said liquid milk is fat-free.

18. The method of claim 11 wherein the food grade acid added in step (f) is glucono-δ-lactone.

19. The method of claim 11 wherein said curd and salt mixture has a salt concentration of about 1.0% to 2.0% by weight.

20. A process of manufacturing a lower-fat mozzarella cheese that needs no aging to obtain acceptable melting properties without burning when baked on a pizza comprising the steps of:

(a) providing a liquid milk having a fat content less than 1.5% or a casein to fat weight ratio greater than 1.5;

(b) mixing said liquid milk with an effective amount of a food grade acid to obtain a mixture such that the pH thereof is in the range of about 4.8 to 5.8;

(c) adding an effective amount of a coagulation agent to said mixture such that said mixture is coagulated to result in formation of curds and whey;

(d) cutting said curds into pieces and stirring said pieces in said whey to promote syneresis;

(e) draining said whey from said pieces;

(f) stretching said pieces from which the whey has been drained in hot water or hot salt brine; and (g) cooling said pieces that have been stretched in water brine, or air such that a lower-fat mozzarella cheese having a salt concentration of about 0.5% to 3.0% by weight is obtained.

21. The method of claim 20 wherein said food grade acid is a member of the group consisting of adipic, citric, lactic, acetic, phosphoric, hydrochloric, propionic, butyric, $C_1$–$C_8$ carboxylic acids, glucono-δ-lactone, and mixtures thereof.

22. The method of claim 21 wherein said food grade acid is glucono-δ-lactone.

23. The method of claim 20 wherein said coagulation agent is a member of the group consisting of rennet, chymosin, pepsin, microbial rennets, recombinant rennets, and mixtures thereof.

24. The method of claim 23 herein said mixture further comprises at least one member selected from the group consisting of emulsifiers, microparticulated proteins, emulsifying salts, calcium chelating agents, and stabilizers.

25. The method of claim 24 wherein said emulsifiers are selected from the group consisting of lecithin, soy protein isolates, lipoproteins, and mono- and di-glycerides.

26. The method of claim 24 wherein said stabilizers are selected from the group consisting of starches, modified starches, dextrins, maltodextrins, pectins, carrageenans, microcrystalline cellulose, carboxymethylcellulose, and gelatin.

27. The method of claim 20 wherein said liquid milk is fat-free.

28. The method of claim 20 wherein the pH of said mixture is in the range of pH 5.2 to 5.6.

29. The method of claim 20 wherein said lower-fat mozzarella cheese has a salt concentration of about 1.0% to 2.0% by weight.

30. The method of claim 20 further comprising adding dry salt to said pieces from which the whey has been drained.

31. A process of manufacturing a lower-fat mozzarella cheese that needs no aging to obtain acceptable melting properties without burning when baked on a pizza comprising the steps of:

(a) providing a liquid milk having a fat content less than 1.5% or a casein to fat weight ratio greater than 1.5;

(b) mixing said liquid milk with an effective amount of a food grade acid to obtain a mixture such that the pH thereof is in the range of about 5.6 to 6.0;

(c) adding an effective amount of a coagulation agent to said mixture such that said mixture is coagulated to result in formation of curds and whey;

(d) cutting said curds into pieces and stirring said pieces in said whey to promote syneresis;

(e) draining a portion of said whey from said pieces;

(f) adding an additional amount of food grade acid to said pieces from which a portion of the whey has been removed to further lower the pH, stirring until the pH is about pH 5.1 to 5.6, and then draining the remaining whey;

(g) stretching said pieces from which all of the whey has been drained in hot water or hot salt brine; and (h) cooling said pieces that have been stretched to obtain a lower-fat mozzarella cheese having a salt concentration of about 0.5% to 3.0% by weight.

32. The method of claim 31 wherein said food grade acid is a member of the group consisting of adipic, citric, lactic, acetic, phosphoric, hydrochloric, propionic, butyric, $C_1$–$C_8$ carboxylic acids, glucono-δ-lactone, and mixtures thereof.

33. The method of claim 31 wherein said coagulation agent is a member of the group consisting of rennet, chymosin, pepsin, microbial rennets, recombinant rennets, and mixtures thereof.

34. The method of claim 33 wherein said mixture further comprises at least one member selected from the group consisting of emulsifiers, microparticulated proteins, emulsifying salts, calcium chelating agents, and stabilizers.

35. The method of claim 34 wherein said emulsifiers are selected from the group consisting of lecithin, soy protein isolates, lipoproteins, and mono- and di-glycerides.

36. The method of claim 34 wherein said stabilizers are selected from the group consisting of starches, modified starches, dextrins, maltodextrins, pectins, carrageenans, microcrystalline cellulose, carboxymethylcellulose, and gelatin.

37. The method of claim 31 wherein said liquid milk is fat-free.

38. The method of claim 31 wherein the food grade acid added in step (f) is glucono-δ-lactone.

39. The method of claim 31 wherein the salt concentration of the lower-fat mozzarella cheese is about 1–2% by weight.

40. A method of manufacturing a lower-fat process pizza cheese comprising the steps of:

(a) providing a lower-fat pizza cheese starting material;

(b) adding an effective amount of an emulsifying salt to said lower-fat pizza cheese starting material to obtain a process cheese mixture; and then (c) cooking said process cheese mixture at a temperature sufficient to melt said low-fat mozzarella cheese starting material, thereby forming said lower-fat process pizza cheese.

41. The method of claim 40 wherein said lower-fat pizza cheese starting material is manufactured by a process comprising the steps of:

(i) providing a liquid milk having a fat content less than 1.5% or a casein to fat weight ratio greater than 1.5;

(ii) mixing said liquid milk with an effective amount of a food grade acid to obtain a mixture such that the pH thereof is in the range of about 4.8 to 5.8, (iii) adding an effective amount of a coagulation agent to said mixture such that said mixture is coagulated to result in formation of curds and whey, (iv) cutting said curds into pieces and stirring said pieces in said whey to promote syneresis, (v) draining said whey from said pieces, (vi) mixing salt with said pieces from which the whey has been drained to obtain a curd and salt mixture with a salt concentration of about 0.5% to 3.0% by weight, and (vii) pressing said curd and salt mixture into blocks to obtain a lower-fat pizza cheese starting material.

42. The method of claim 40 wherein said food grade acid is a member of the group consisting of adipic, citric, lactic, acetic, phosphoric, hydrochloric, propionic, butyric, $C_1$–$C_8$ carboxylic acids, glucono-δ-lactone, and mixtures thereof.

43. The method of claim 42 wherein said food grade acid is glucono-δ-lactone.

44. The method of claim 41 wherein said coagulation agent is a member of the group consisting of rennet, chymosin, pepsin, microbial rennets, recombinant rennets, and mixtures thereof.

45. The method of claim 44 wherein said mixture further comprises at least one member selected from the group consisting of emulsifiers, microparticulated proteins, emulsifying salts, calcium chelating agents, and stabilizers.

46. The method of claim 45 wherein said emulsifiers are selected from the group consisting of lecithin, soy protein isolates, lipoproteins, and mono- and di-glycerides.

47. The method of claim 45 wherein said stabilizers are selected from the group consisting of starches, modified starches, dextrins, maltodextrins, pectins, carrageenans, microcrystalline cellulose, carboxymethylcellulose, and gelatin.

48. The method of claim 41 wherein the pH of said mixture is in the range of pH 5.2 to 5.6.

49. The method of claim 40 wherein said lower-fat pizza cheese starting material is manufactured by a process comprising the steps of:

(i) providing a liquid milk having a fat content less than 1.5% or a casein to fat weight ratio greater than 1.5;

(ii) mixing said liquid milk with and effective amount of a food grade acid to obtain a mixture such that the pH thereof is in the range of about 5.6 to 6.0;

(iii) adding an effective amount of a coagulation agent to said mixture such that said mixture is coagulated to result in formation of curds and whey;

(iv) cutting said curds into pieces and stirring said pieces in said whey to promote syneresis;

(v) draining a portion of said whey from said pieces;

(vi) adding an additional amount of food grade acid to said pieces from which a portion of the whey has been drained to further lower the pH, stirring until the pH is about pH 5.1 to 5.6, and then draining the remaining whey;

(vii) mixing salt with said pieces from which the whey has been drained to obtain a curd and salt mixture with a salt concentration of about 0.5% to 3.0% by weight; and (viii) pressing said curd and salt mixture into blocks to obtain a lower-fat pressed pizza cheese.

50. The method of claim 49 wherein said food grade acid is a member of the group consisting of adipic, citric, lactic, acetic, phosphoric, hydrochloric, propionic, butyric, $C_1$–$C_8$ carboxylic acids, glucono-δ-lactone, and mixtures thereof.

51. The method of claim 49 wherein said coagulation agent is a member of the group consisting of rennet, chymosin, pepsin, microbial rennets, recombinant rennets, and mixtures thereof.

52. The method of claim 51 wherein said mixture further comprises at least one member selected from the group consisting of emulsifiers, microparticulated proteins, emulsifying salts, calcium chelating agents, and stabilizers.

53. The method of claim 52 wherein said emulsifiers are selected from the group consisting of lecithin, soy protein isolates, lipoproteins, and mono- and di-glycerides.

54. The method of claim 52 wherein said stabilizers are selected from the group consisting of starches, modified starches, dextrins, maltodextrins, pectins, carrageenans, microcrystalline cellulose, carboxymethylcellulose, and gelatin.

55. The method of claim 49 wherein the food grade acid added in step (f) is glucono-δ-lactone.

56. The method of claim 40 wherein said liquid milk is fat-free.

57. The method of claim 40 wherein said curd and salt mixture has a salt concentration of about 1.0% to 2.0% by weight.

58. The method of claim 40 wherein said process cheese mixture further comprises at least one member selected from the group consisting of salt, flavorings, and milk solids.

* * * * *